No. 672,069. Patented Apr. 16, 1901.
E. SENDELBACH.
TIRE SETTING MACHINE.
(Application filed June 13, 1900.)
(No Model.) 2 Sheets—Sheet 1.
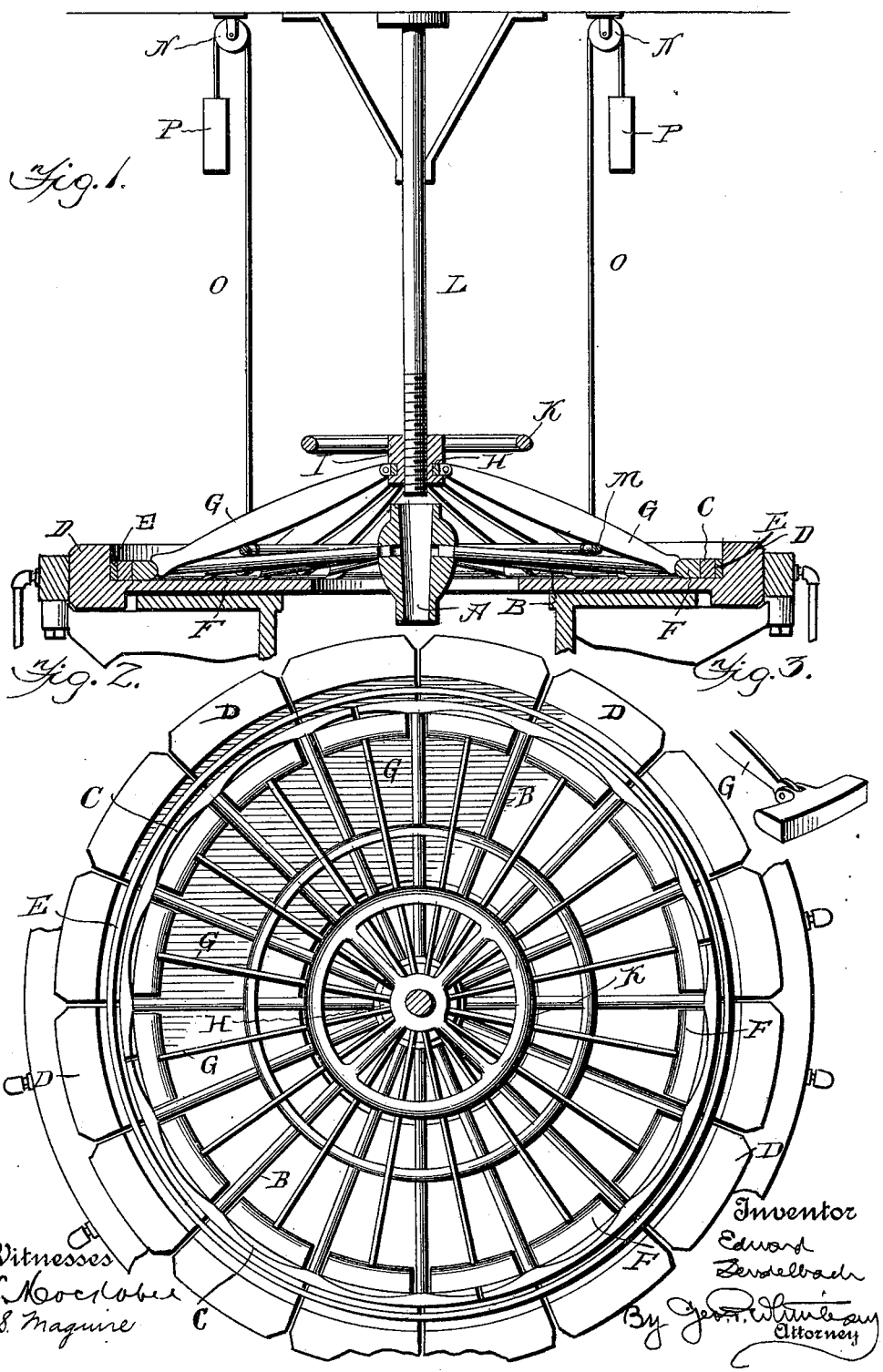

No. 672,069. Patented Apr. 16, 1901.
E. SENDELBACH.
TIRE SETTING MACHINE.
(Application filed June 13, 1900.)
(No Model.) 2 Sheets—Sheet 2.
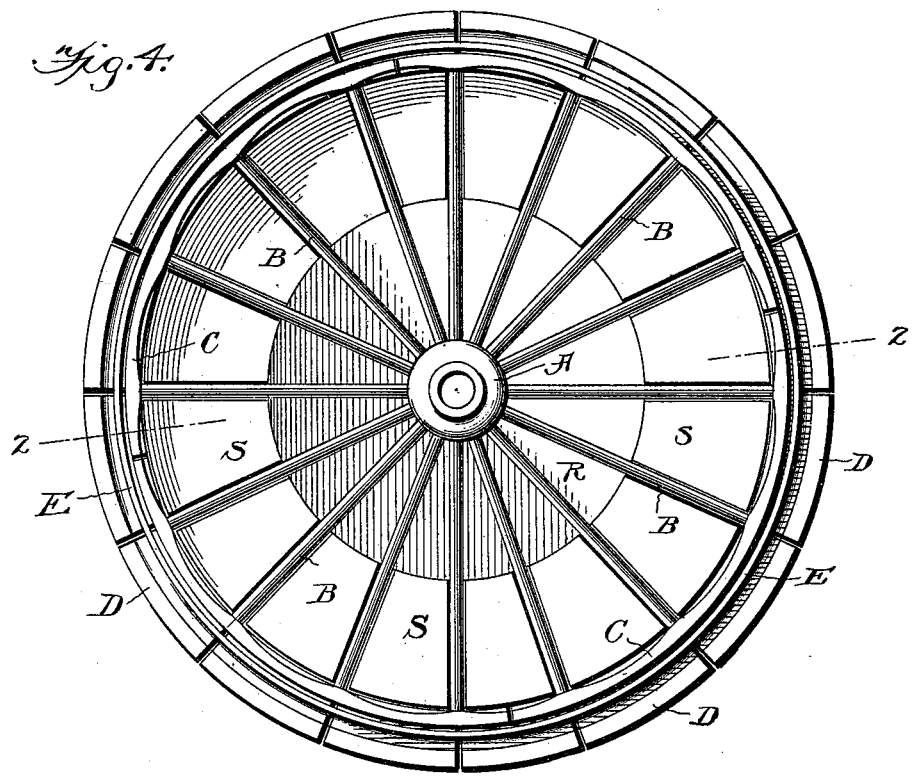
Fig. 4.
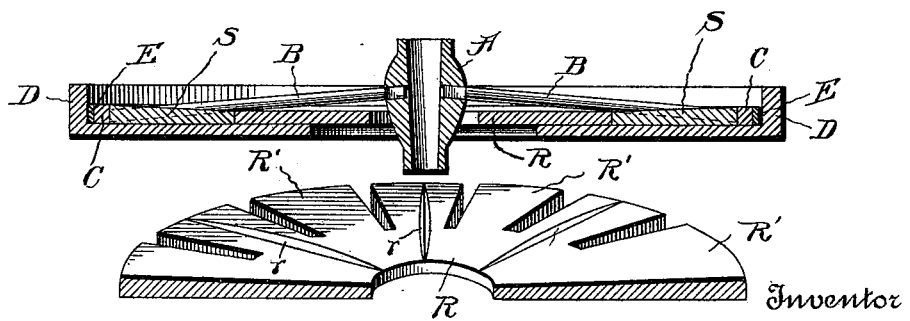
Fig. 5.
Fig. 6.
Witnesses Inventor
Edward Sendelbach,
By Geo. T. Whitney
Attorney

UNITED STATES PATENT OFFICE.

EDWARD SENDELBACH, OF TERRE HAUTE, INDIANA, ASSIGNOR OF ONE-HALF TO CHARLES MINSHALL, OF SAME PLACE.

TIRE-SETTING MACHINE.

SPECIFICATION forming part of Letters Patent No. 672,069, dated April 16, 1901.

Application filed June 13, 1900. Serial No. 20,179. (No model.)

*To all whom it may concern:*

Be it known that I, EDWARD SENDELBACH, a citizen of the United States, residing at Terre Haute, in the county of Vigo and State of Indiana, have invented certain new and useful Improvements in Tire-Setting Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to machines for setting tires on vehicle-wheels; and its object is to limit the concentric contraction of the wheel during the operation of setting the tire.

Tires are ordinarily set in one of two ways, either by expanding the tire by heat and then allowing it to contract on the wheel while cooling or by "upsetting" the cold tire by means of powerful compressors acting simultaneously at all points around the circumference of the wheel. Both these methods for contracting the tire frequently cause injury to the joints of the spokes in the hub for the reason that the concentric inward movement is not limited or checked in any way, but is permitted to progress beyond the point where the compression is sufficient to set the tire properly. This often seriously damages the hub and the spokes. My invention aims to obviate this trouble; and it consists in a rigid stop concentric with the hub and adapted to check and positively limit the inward movement of the spokes, rim, and tire.

In the drawings, Figure 1 is a sectional elevation of a machine embodying my invention. Fig. 2 is a plan view of the same. Fig. 3 shows a modified detail of construction. Fig. 4 is a plan view of a wheel and the compressors of a tire-setting machine, showing another embodiment of my invention. Fig. 5 is a cross-section of the same on the line $z\,z$, Fig. 4. Fig. 6 shows a further modification.

The wheel may be of any desired construction, having a hub A, spokes B, and rim C, which may be in any number of sections, four being shown in Fig. 4.

The tire-setting machine may be of any of the well-known types in which a circle of compressor-jaws D can be radially contracted by suitable mechanism upon the wheel and its tire E, so as to upset the latter and compress it tightly on the rim of the wheel. Such a machine is shown in the patent to J. B. West, dated June 5, 1894, No. 520,817. Portions of this machine are indicated in Figs. 1 and 2. In order to have a fixed and absolute stop against which the inside of the rim can be supported to prevent crushing the wheel, I provide a series of rigid members F, preferably made of metal, fitting loosely between the spokes and supported in the same plane as the rim and tire of the wheel in any suitable manner—as, for instance, by portions of the jaws D. The outer edge of each member corresponds in curvature to the wheel-rim, so as to fit snugly against it. As these rigid members or bunkers are loose, it becomes necessary to provide means for supporting them in position. This may be done in a variety of ways, but I prefer the one shown in Fig. 1. A series of radial struts G are pivoted to a collar H, turning loosely on a nut I, which can be run up and down by a hand-wheel K on a screw-threaded upright stationary shaft L, suspended from a strong supporting structure over the center of the tire-setting machine. The ends of the struts are adapted to fit against the inside of the bunkers F, with which they come in contact while the nut is still above the hub. By giving the hand-wheel K a partial rotation, so as to cause a slight downward movement of the nut on the shaft, the toggle action of the nut and the struts will force the latter firmly against the bunkers. In this position the struts afford an absolute and rigid stop to any further contraction of the wheel. Continued inward movement of the compressor-jaws D only serves to compress the wood of the rim between the jaws and the bunkers. The tire will of course be further upset at the same time, so that it will be tightly held in place by the expansion of the wood of the rim when the jaws D are opened. The operation having been completed, the jaws are drawn back and the nut is run up on the shaft, withdrawing the struts from the bunkers. As the struts now hang loosely between the spokes of the wheel, it is desirable to be able to lift them all quickly out of the way to permit the wheel to be removed from the machine. To accomplish this simultaneously, I provide a ring M, lying under all the struts. The weight of the ring and the struts is counterbalanced by any suitable device, such as weights P, attached to cords O, running over pulleys N. By an upward push the ring will lift all the struts and hold them out of the way while a new wheel is being substituted for the one just operated on.

It will be observed that the pivoted struts can be used with any number of sets of loose bunkers of various degrees of curvature corresponding with wheels of different sizes. If a large number of wheels of the same size is being built or treated, it may be convenient to have the bunkers hinged to the ends of the struts, as shown in Fig. 3.

In the modification shown in Figs. 4 and 5 I place around the hub and under the spokes a wide ring R of some stiff rigid material, such as cast-iron. This ring lies in the plane of the rim, and it may be of any desired size, preferably extending to the point where the spokes intersect this plane. Between the periphery of the ring and the rim of the wheel I place the series of rigid members or bunkers, such as the sector-shaped plates S, fitting loosely between the spokes and abutting at their inner ends against the edge of the ring. The outer ends of the plates S lie in a circle of predetermined size whose actual dimensions vary with the size of the wheel under treatment. In every case, however, the circumference of the circle is the size to which the inside of the wheel-rim is to be contracted. The ring and the plates are supported in the same plane as the rim and tire of the wheel in any suitable manner—as, for instance, by portions of the jaws D.

As a further modification the rigid members surrounding the ring R may be integral with it, as shown in Fig. 6, where the ring is provided with a series of radial arms R', which may be stiffened by ribs r, if desired. If the loose plates S are used, several sets of different widths and lengths may be provided, so that one central ring will serve for wheels of many sizes.

It will be seen that in every case my device serves also as a gage, so that all the wheels set by it will be of the same size.

In place of the nut and screw-threaded shaft any other equivalent device for accomplishing the vertical movement of the collar to which the struts are pivoted may be used.

Having thus described my invention, what I claim is—

1. The combination with a tire-setting machine having a circle of radially-movable jaws, and means for simultaneously moving said jaws inwardly in order to upset the tire upon the wheel, of means for positively limiting the concentric contraction of the wheel.

2. The combination with a tire-setting machine having a circle of radially-movable jaws, and means for simultaneously moving said jaws inwardly in order to upset the tire upon the wheel, of a rigid stop concentric with the hub and adapted to positively limit the contraction of the wheel.

3. The combination with a tire-setting machine having a circle of radially-movable jaws, and means for simultaneously moving said jaws inwardly in order to upset the tire upon the wheel, of a rigid support concentric with the hub, and rigid members extending from said support to a circle of predetermined size.

4. The combination with a tire-setting machine having a circle of radially-movable jaws, and means for simultaneously moving said jaws inwardly in order to upset the tire upon the wheel, of a series of loose bunkers adapted to fit between the spokes and against the rim of the wheel, and means for rigidly maintaining said bunkers in a circle of predetermined size.

5. The combination with a tire-setting machine having a circle of radially-movable jaws, and means for simultaneously moving said jaws inwardly in order to upset the tire upon the wheel, of a series of loose bunkers adapted to fit between the spokes and against the rim of the wheel, an upright shaft concentric with the wheel, and struts carried by the shaft and adapted to bear against the inside of the bunkers.

6. The combination with a tire-setting machine having a circle of radially-movable jaws, and means for simultaneously moving said jaws inwardly in order to upset the tire upon the wheel, of a series of loose bunkers adapted to fit between the spokes and against the rim of the wheel, an upright shaft concentric with the wheel, a collar surrounding the shaft, struts pivoted to said collar and adapted to bear against the bunkers, and means for moving said collar up and down on said shaft.

7. The combination with a tire-setting machine having a circle of radially-movable jaws, and means for simultaneously moving said jaws inwardly in order to upset the tire upon the wheel, of a series of loose bunkers adapted to fit between the spokes and against the rim of the wheel, an upright screw-threaded shaft arranged over the center of the wheel, a nut on said shaft, a collar carried by the nut, and struts pivoted to said collar and adapted to bear against the bunkers.

8. The combination with a tire-setting machine having devices for compressing the tire upon the wheel, of a series of rigid struts adapted to bear against the inside of the wheel-rim, a central shaft carrying the inner ends of said struts, and means for lifting all of the free outer ends of the struts simultaneously.

9. The combination with a tire-setting machine having devices for compressing the tire upon the wheel, of a series of rigid struts adapted to bear against the inside of the wheel-rim, a central shaft to which the inner ends of the struts are pivotally connected, a ring lying underneath all said struts, and means for lifting the ring.

10. The combination with a tire-setting machine having devices for compressing the tire upon the wheel, of a series of rigid struts adapted to bear against the inside of the wheel-rim, a central shaft to which the inner ends of the struts are pivotally connected, a ring lying underneath all the struts, and counterbalancing-weights connected with said ring.

In testimony whereof I affix my signature in presence of two witnesses.

EDWARD SENDELBACH.

Witnesses:
 Jos. V. Banks,
 W. C. Clark.